United States Patent
Monji

(10) Patent No.: US 6,226,421 B1
(45) Date of Patent: May 1, 2001

(54) IMAGE INPUT DEVICE

(75) Inventor: Yosuke Monji, Fukuoka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/014,606

(22) Filed: Jan. 28, 1998

(30) Foreign Application Priority Data

Jan. 30, 1997 (JP) .................................................. 9-016122

(51) Int. Cl.[7] .................................................. G06K 9/32
(52) U.S. Cl. ........................................... 382/300; 382/312
(58) Field of Search .................................... 382/300, 299, 382/312, 317, 321; 358/400, 401, 403, 428, 451, 474, 497, 296; 345/132

(56) References Cited

U.S. PATENT DOCUMENTS

| 3,974,325 | * | 8/1976 | Wilmer ..................................... 178/6 |
| 4,776,031 | * | 10/1988 | Mita ....................................... 382/67 |
| 5,331,426 | * | 7/1994 | Kato et al. ............................. 358/426 |
| 5,463,295 | * | 10/1995 | Inde ....................................... 358/442 |
| 5,465,166 | * | 11/1995 | Kamo ..................................... 358/451 |
| 5,489,990 | * | 2/1996 | Ishikawa ............................... 358/451 |
| 5,642,207 | * | 6/1997 | Smitt ..................................... 358/474 |
| 5,704,019 | * | 12/1997 | Akiyama et al. ..................... 395/101 |
| 5,748,800 | * | 5/1998 | Ueta et al. ............................. 382/266 |
| 5,754,192 | * | 5/1998 | Sugaya ................................ 346/33 R |

* cited by examiner

Primary Examiner—Leo Boudreau
Assistant Examiner—Kanji Patel
(74) Attorney, Agent, or Firm—Stevens, Davis, Miller & Mosher, L.L.P.

(57) ABSTRACT

An image input device includes an image reader capable of realizing conversion of image resolution. The image input device includes a scanner driving unit provided with a resettable resolution arithmetic unit, a resolution interpolating process change-over unit and a resolution interpolating unit. The presettable resolution arithmetic unit sets at a scanner unit a resolution designated by a user unless the designated resolution exceeds a maximum presettable resolution of the scanner. If the user designated resolution exceeds the maximum presettable resolution, the presettable resolution arithmetic unit sets at the scanner a predetermined resolution which does not exceed the maximum presettable resolution. The resolution interpolating processing unit interpolates the image data outputted from the scanner unit for generating the image data of the resolution designated by the user. The resolution interpolating processing can be performed either in a primary scanning direction or in a secondary scanning direction or in both directions.

25 Claims, 10 Drawing Sheets

IMAGE INPUT DEVICE

BACKGROUND OF THE INVENTION

1. Field of the Invention

The present invention relates generally to an image input device employed in an image reading apparatus such as an image scanner apparatus or the like.

2. Description of Related Art

For having better understanding of the concept underlying the invention, description will first be made of a conventional image input device known heretofore. FIG. 9 of the accompanying drawings is a block diagram showing generally and schematically an arrangement of a conventional image input device. As can be seen in this figure, the image input device is composed of a scanning unit 61 and a scanner driving unit 66.

The scanning unit 61 is comprised of an original reading module 62, a resolution converting module 63, an image processing module 64 and an image type transforming module 65. On the other hand, the scanner driving unit 66 includes a read range designating module 67, a resolution designating module 68, an image processing designating module 69 and an image type designating module 70.

The original reading module 62 constituting a part of the scanning unit 61 includes a light source (not shown) for reading the image from an original such as a document or the like. More specifically, the original is illuminated with light emitted from the light source, and the light rays reflected from or transmitted through the original are converted into an analogue electric signal through a photoelectric conversion. The analogue electric signal thus obtained then undergoes an analogue-to-digital conversion (A/D conversion for short) by an A/D converter (not shown). While performing the operation mentioned above on a line-by-line basis in a primary scanning direction within an image read range set previously, the original reading module 62 is moved sequentially in a secondary scanning direction with the image data being outputted.

The read range designating module 67 constituting a part of the scanner driving unit 66 is generally so designed as to determine an image reading range with the aid of the user. On the other hand, the resolution designating module 68 serves for determining the reading resolution of the scanning unit 61 (i.e., resolution with which the scanning unit 61 is to read the image from the original). Further, the image processing designating module 69 determines the processing to be performed on the image data upon reading thereof. In addition, the image type designating module 70 indicates or designates an image type in the image reading operation. Individual items indicated or designated by the modules 67, 68, 69 and 70 are set at the scanning unit 61. Thus, the scanning unit 61 can execute the processing for reading the original in accordance with the designated items as set. In this way, an output image demanded by the user can be generated.

At this juncture, description will be directed to a resolution converting process in the conventional image input device. It is assumed, by way of example, that image data having an optical resolution of 600 dpi outputted from the scanning unit 61 is to be converted into image data of another resolution which lies within a range of 60 to 2400 dpi.

Conversion of the resolution of the image data in the primary scanning direction can be achieved generally by resorting to a digital differential analysis algorithm (DDA algorithm for short). FIG. 10 of the accompanying drawings is a view for illustrating a resolution converting processing in the primary scanning direction performed in the scanning unit. More specifically, there are shown in FIG. 10 straight lines having respective slopes which correspond to different resolutions relative to a vector for which the ratio between the number of the input pixels and that of the output pixels is 1:1 (e.g. the case where the resolution is 600 dpi in both the input image and the output image). In more detail, in FIG. 10, there are illustrated, by way of example, resolutions of 240 dpi (40%) and 900 dpi (150%) in the output images, respectively.

In conjunction with conversion of the resolution in the primary scanning direction from 600 dpi to 240 dpi, there can be derived the below mentioned relation (1) in calculating the input pixels $\underline{x}$ for the output pixel $\underline{y}$ after the conversion in accordance with "x=2.5y" which represents a reverse function of "y=0.4x" shown in FIG. 10. Namely, $$S1 = 25.4 \text{ mm}/(60 \cdot T) \text{ mm/sec} \geq \text{feeding speed} \geq S2 = 25.4 \text{ mm}/(2400 \cdot T) \text{ mm/sec} \quad (1)$$

The above expression (1) indicates that 2.5 pixels are generated from the input pixel for a first output pixel y=1 for allocation thereto while for a second output pixel y=2, five pixels are allocated.

In this way, the pixels are generated from the input pixel at the ratio given by the above expression to be outputted as the output pixels.

On the other hand, for conversion of the input image having the resolution of 600 dpi into an image having the resolution of 900 dpi, there can be derived the undermentioned relation for calculation of the input pixels $\underline{x}$ for each output pixel $\underline{y}$ in accordance with a function "x=0.67y" which is reverse to "y=1.5x" shown in FIG. 10.

$$(y, x) = (1, 2.5), (2, 5.0), (3, 7.5), \quad (2)$$

At this juncture, it should be mentioned that for determining the image data for the fragmentary pixel, a weighted mean of two adjacent pixels is used. For instance, 1.33 pixel can be determined as follows:

$$(y, x) = (1, 0.67), (2, 1.33), (3, 2), \quad (3)$$

As is apparent from the above description, when the input image is converted into an image of lower resolution, the input image data is subjected to a thinning processing whereas in conversion of the input image into an image of higher resolution, a thickening processing is effectuated.

The resolution converting processing in the secondary scanning direction can be effectuated by translating the distance for which the original reading module 62 is displaced in the secondary scanning direction during a charge storing period (T sec.) taken for the photoelectric conversion by the original reading module 62. More specifically, the conversion of resolution is realized by changing the feeding speed of the original reading module 62 within the range of S1 to S2 corresponding to the resolution range of 60 to 2400 dpi in accordance with the following expression (4):

$$(\text{first pixel}) \times 0.67 + (\text{second pixel}) \times 0.33 \quad (4)$$

As is apparent from the above description, with the conventional image input device, the resolution converting processing of the image data is carried out internally of the scanning unit 61. As a consequence, the structure of the scanning unit 61 tends to be very complicated, involving difficulty in fabricating the scanning unit 61 at low cost.

Further, in the conventional image input device, the resolution interpolating (converting) processing is performed by thinning or thickening the data hardwarewise in the primary scanning direction. On the other hand, conversion of the resolution in the secondary scanning direction is carried out by controlling variably the distance for which the image read module is moved on a line-by-line basis. Consequently, the range of resolutions susceptible to the conversion is limited by limitation imposed on a motor feeding control, giving rise to a problem.

Of course, it is certainly possible to realize conversion of the resolution in the secondary scanning direction by resorting to other method than the motor feeding speed control. In that case, however, it will become necesily to increase the capacity of the line buffer memory, which results in a complicated circuit configuration and hence complicated structure of the device.

SUMMARY OF THE INVENTION

In light of the state of the art described above, it is an object of the present invention to provide an image input device in which the structure of an image reading unit is simplified by allowing input image data interpolating processing to be executed by a module other than the image reading unit.

Another object of the present invention is to provide an image input device capable of performing conversion of the resolution in the secondary scanning direction with a given ratio with a simplified structure.

In view of the above and other objects which will become apparent as the description proceeds, the present invention provides an image input device which includes an image data reading unit for reading image data from an original with a predetermined resolution to thereby output image data, and a control unit for controlling original reading operation of the image data reading module and performing predetermined processing on the image data outputted from the image data reading module, wherein the control unit includes an interpolating unit for interpolating image data outputted from the image data reading module on the basis of values of individual pixels of the image data to thereby generate image data of a desired resolution.

With the arrangement of the image input device described above, the resolution converting processing of the image data read by the image reading module is performed by the image reading control unit. Thus, the structure of the image reading module can be simplified, to a great advantage.

Further, the present invention provides an image input device in which the interpolating unit includes a first interpolating module for interpolating the image data outputted from the image data reading module in a primary scanning direction to thereby generate image data having a desired resolution, a second interpolating module for interpolating the image data outputted from the image data reading module in a secondary scanning direction to thereby generate image data having a desired resolution, and a third interpolating module for interpolating the image data outputted from the image data reading unit in the primary scanning direction and the secondary scanning direction to thereby generate image data having a desired resolution.

By virtue of the arrangement of the image input device described above, there can be obtained image data interpolated to a desired resolution not only in the primary scanning direction but also in the secondary scanning direction.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

General Description

Figure 1:
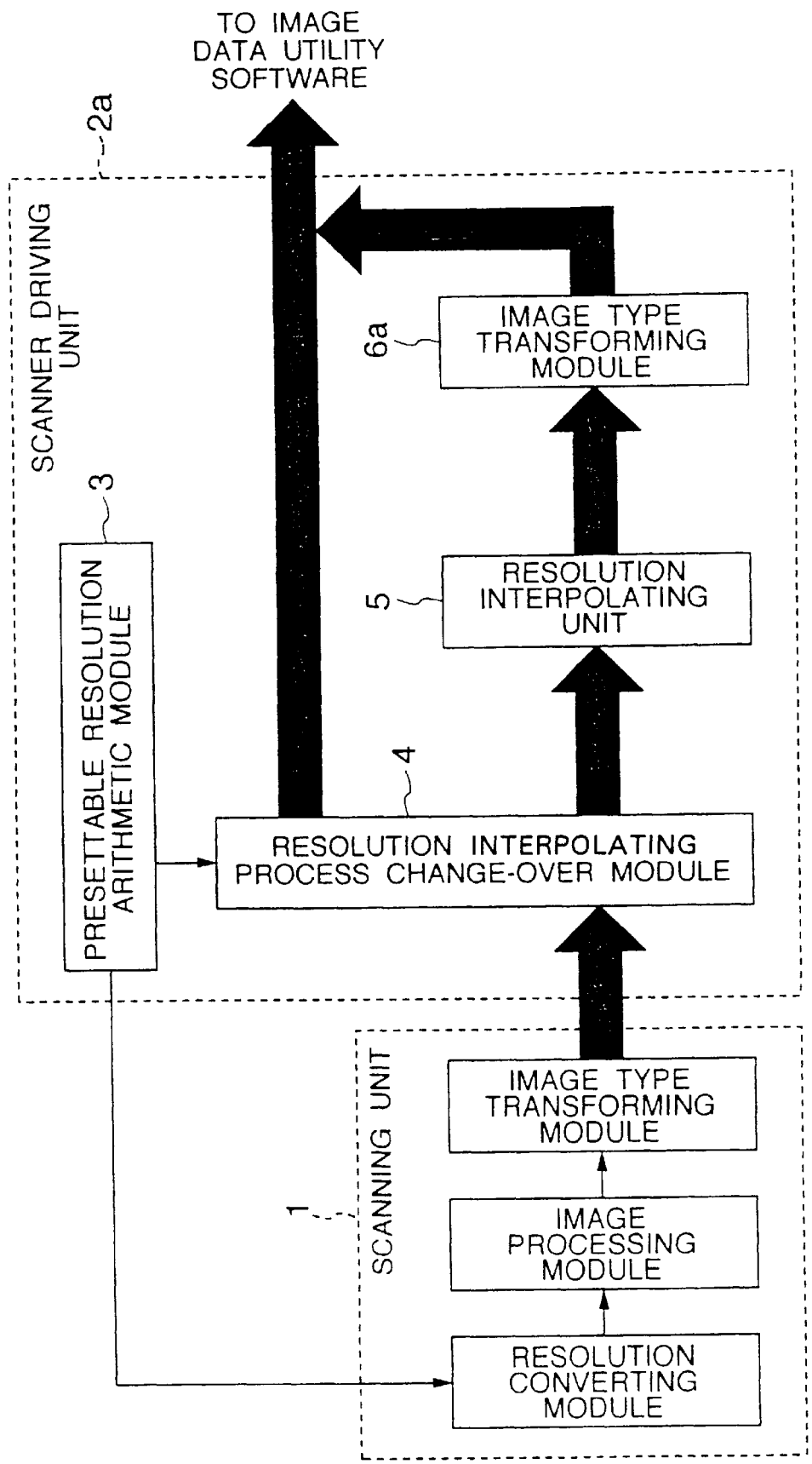
FIG. 1 is a block diagram showing generally and schematically a configuration of an image input device according to a first embodiment of the present invention.

Before entering into detailed description of preferred embodiments, general features or aspects of the present invention will be briefed.

An image input device according to a first aspect of the present invention includes an image data reading unit for reading image data from an original with a predetermined resolution to thereby output the image data, and a control unit provided in association with the image data reading unit for controlling original reading operation of the image data reading unit and additionally performing predetermined processings on the image data outputted from the image data reading unit, wherein the control unit includes an interpolating unit for interpolating image data outputted from the image data reading unit on the basis of values of individual pixels to thereby generate image data of a desired resolution.

By virtue of the arrangement of the image input device described above, the image reader unit can be implemented in a simplified structure, which contributes to inexpensive implementation of the image input device in a miniaturized structure.

According to a second aspect of the invention, the control unit further includes a resolution arithmetic module for setting resolution with which the image data reading unit reads the image data from the original and making decision as to whether the image data outputted from the image data reading unit is to be interpolated or not, and a selecting module for determining on the basis of the result of the decision made by the resolution arithmetic module whether or not the image data outputted from the image data reading unit is to be outputted to the interpolating unit.

Owing to the arrangement of the image input device described above, the user can designate a desired resolution without need for knowing the maximum resolution of the image reading unit. Besides, the interpolation processing for the image data can be performed properly in accordance with the designated resolution. Thus, the image data having a desired resolution can be obtained.

According to a third aspect of the invention which is directed to another preferred mode for implementing the second aspect of the invention described above, the resolution arithmetic module is so arranged as to set resolutions for reading operations in a primary scanning direction and a secondary scanning direction, respectively, make decision as to whether the image data outputted from the image data reading unit is to be interpolated or not, and decide the scanning direction in which the interpolation is to be performed, to thereby output to the selecting module the result of decision as to necessity or non-necessity of the interpolation or the result of the decision concerning the scanning direction.

With the arrangement mentioned above, the resolution interpolating processing can be executed not only in the primary scanning direction but also in the secondary scanning direction.

According to a fourth aspect of the invention which is directed to yet another preferred mode for implementing the second aspect of the invention, the interpolating unit includes a first interpolating module for interpolating the image data outputted from the image data reading unit in a primary scanning direction to thereby generate image data having a desired resolution, a second interpolating module for interpolating the image data outputted from the image data reading unit in a secondary scanning direction to thereby generate image data having a desired resolution, and a third interpolating module for interpolating the image data outputted from the image data reading unit in the primary scanning direction and the secondary scanning direction to thereby generate image data having a desired resolution.

With the arrangement described above, the image data interpolating processing can be performed either in the primary scanning direction or in the secondary scanning direction or in both directions, whereby the image data having a desired resolution can be obtained.

According to a fifth aspect of the invention which is directed to implementation of any one of the second to fourth aspects mentioned above, the selecting module is so designed that upon reception of the result of decision indicating necessity of the interpolation from the resolution arithmetic module, the selecting module outputs the image data to one of the first interpolating module, the second interpolating module and the third interpolating module in dependence on the result of the decision as to the scanning direction.

Owing to the arrangement described above, the interpolation processing can be performed by the relevant interpolating module in dependence on the scanning direction in which the interpolation processing is required.

According to a sixth aspect of the invention which is directed to implementation of any one of the second to fifth aspects mentioned above, the resolution arithmetic module is so designed as to set as the reading resolution of the image data reading unit a designated resolution supplied externally while setting as the resolution of the image data reading unit a resolution differing from the designated resolution when the designated resolution exceeds a maximum resolution which can be set for the image data reading unit, and outputs to the selecting module the result of decision indicating that the image data outputted from the image data reading unit should be interpolated.

Owing to the arrangement described above, the image reading operation can be performed with a predetermined resolution even when the designated resolution exceeds the maximum resolution of the image reading unit. To say this in another way, when the resolution exceeding the maximum resolution of the image reading unit is designated or inputted, a decision is made to the effect that the interpolation processing should be executed, whereby the predetermined resolution converting processing is effectuated for the image data outputted from the image reading unit.

According to a seventh aspect of the invention which is directed to a further mode for implementing the sixth aspect described above, the resolution arithmetic module is designed to set the maximum resolution as the image data reading resolution when the designated resolution exceeds the maximum resolution of the image reading means.

With the above arrangement, the image reading operation is performed by the image reading unit with the maximum resolution when the resolution exceeding the maximum resolution of the reading unit is designated.

According to an eighth aspect of the invention directed to implementation of the seventh aspect described above, the first interpolating module is so designed as to select pixels from the image data on the basis of a scale factor determined by dividing the reading resolution in the primary scanning direction by the maximum resolution for thereby arithmetically determining output pixels on the basis of the selected pixels. The second interpolating module is so designed as to select one or plural lines in the primary scanning direction from the image data on the basis of a scale factor determined by dividing the reading resolution in the secondary scanning direction by the maximum resolution for thereby arithmetically determining pixels for an output line on the basis of the pixels of the selected line. The third interpolating module is so designed as to select pixels from the image data on the basis of the scale factor determined by dividing the reading resolution in the primary scanning direction by the maximum resolution to thereby arithmetically determine the output pixels on the basis of the selected pixels while selecting one or plural lines in the primary scanning direction from the image data on the basis of the scale factor determined by dividing the reading resolution in the secondary scanning direction by the maximum resolution for thereby arithmetically determining pixels for the output line on the basis of the pixels of the selected line.

With the arrangement described above, the resolution converting processing can be realized without involving increased capacity of the line buffer memory for the interpolation.

According to a ninth aspect of the invention directed to implementation of the sixth aspect, the resolution arithmetic module is so arranged that when the designated resolution exceeds the maximum resolution of the image data reading unit, a maximum value of those resulting from division of the designated resolution by 2n (where n represents an integer) which does not exceed the maximum resolution is set as the reading resolution while result of decision indicating necessity of interpolation is outputted to the selecting module. In that case, the first interpolating module interpolates the image data by repeating each pixel of the image data by 2n times in the primary scanning direction, while the second interpolating module interpolates the image data by repeating each pixel line in the primary scanning direction of the image data by 2n times in the secondary scanning direction. Further, the third interpolating module repeats each of the pixels of the image data by 2n times in the primary scanning direction while repeating 2n times in the secondary scanning direction the pixel line in the primary scanning direction.

Thus, the resolution interpolating processing can be performed in a convenient manner without involving increase in the capacity of the line buffer memory.

According to a tenth aspect of the invention directed to implementation of the first aspect mentioned previously, the control unit further includes an image type transformation processing module for performing transformation processing on the image data outputted from the image reading unit for transforming the image data into a designated image type regardless of whether or not interpolation is performed by the interpolating means. Thus, the transformation of the image data into desired type can be realized without fail.

According to an eleventh aspect of the invention directed to implementation of the tenth aspect mentioned above, the control unit further includes an image processing module for performing predetermined image processing regardless of whether or not interpolation is performed on the image data, and the result of the predetermined image processing is outputted to the image type transformation processing module. Owing to this arrangement, the circuit configuration of the image processor incorporated in the image reading unit can be simplified.

Now, the present invention will be described in detail in conjunction with what is presently considered as preferred or typical embodiments thereof by reference to the drawings. In the following description, like reference characters designate like or corresponding parts throughout the several views.

Embodiment 1

FIG. 1 is a block diagram showing generally and schematically a configuration of an image input device according to a first embodiment of the present invention. As is shown in the figure, the image input device includes a scanning unit 1 and a scanner driving unit 2a. The scanning unit 1 is composed of a resolution converting module for converting the resolution of image data read from an original by means of a pixel reader (not shown) to a predetermined resolution for enlargement or contraction of the image, an image processing module for performing a variety of image processings set previously, and an image type transforming module for transforming the image data into image data of a preset type.

On the other hand, the scanner driving unit 2a is comprised of a presettable resolution arithmetic module 3 for arithmetically determining a reading resolution to be set previously for the scanning unit 1 on the basis of a reading resolution designated or inputted by the user (hereinafter referred to as the designated reading resolution), a resolution interpolating process change-over module 4 for changing over the resolution interpolating process for the image data outputted from the scanning unit 1 in accordance with the designated reading resolution when the preset reading resolution set by the presettable resolution arithmetic module 3 and the designated reading resolution differ from each other, a resolution interpolating unit 5 for executing a predetermined resolution interpolating process for the image data outputted from the scanning unit 1, and an image type transforming module 6a for transforming the image data undergone the resolution interpolating process into the type of image data designated by the user.

At this juncture, it should be mentioned that the presettable resolution arithmetic module 3 is so designed as to perform not only the processing for arithmetically determining the reading resolution to be set for the scanning unit 1 but also the execution of the decision processing for deciding whether or not the resolution interpolating process is to be performed for the read image data in a first scanning direction (primary scanning direction) and a second scanning direction (secondary scanning direction), respectively.

Figure 2:
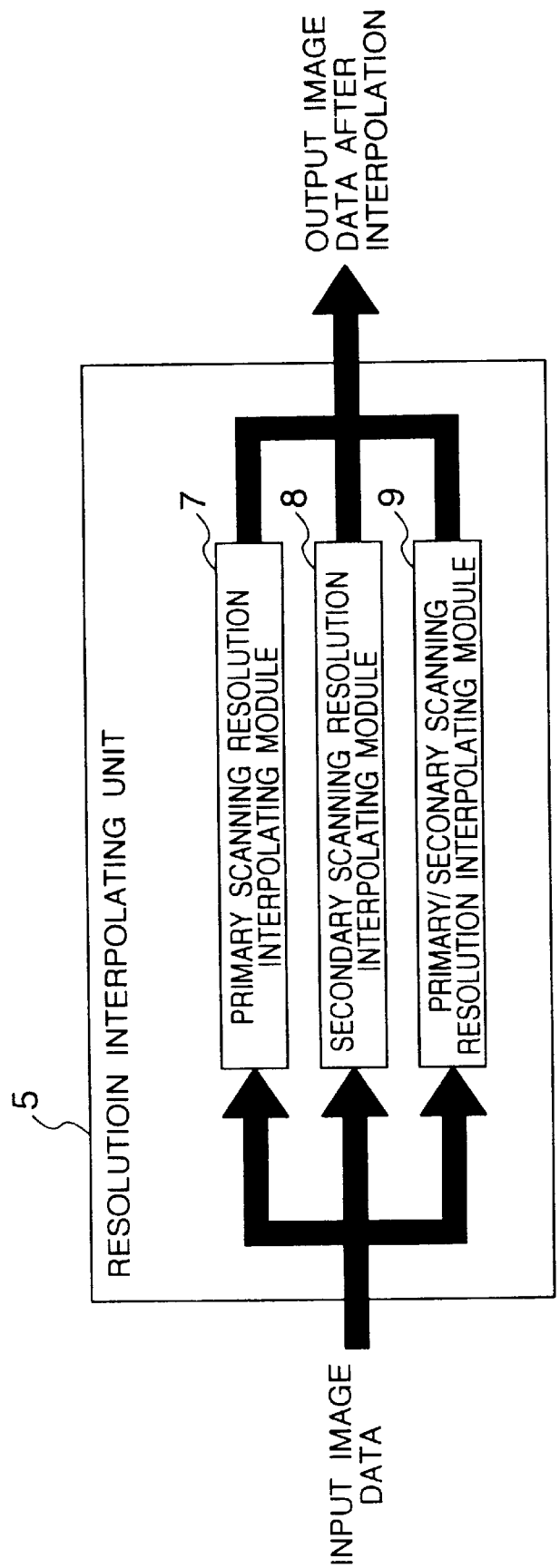
FIG. 2 is a block diagram showing schematically an arrangement of a resolution interpolating unit constituting a part of the image input device shown in FIG. 1.

FIG. 2 is a block diagram showing schematically an arrangement of the resolution interpolating unit constituting a part of the image input device shown in FIG. 1. As can be seen in the figure, the resolution interpolating unit 5 includes a primary scanning resolution interpolating module 7 dedicated only for the interpolation of resolution in the primary scanning direction, a secondary scanning resolution interpolating module 8 dedicated only for the interpolation of resolution in the secondary scanning direction and a primary/secondary scanning resolution interpolating module 9 designed for executing the resolution interpolating processing in both the primary scanning direction and the secondary scanning direction.

In the configuration of the image input device described above, the scanner driving unit 2a corresponds to the control means, the resolution interpolating unit 5 corresponds to the interpolating means, and the resolution interpolating process change-over module 4 corresponds to the selecting means. Further, the primary scanning resolution interpolating module 7, the secondary scanning resolution interpolating module 8 and the primary/secondary scanning resolution interpolating module 9 correspond to the first, second and third interpolation processing means, respectively.

Figure 3:
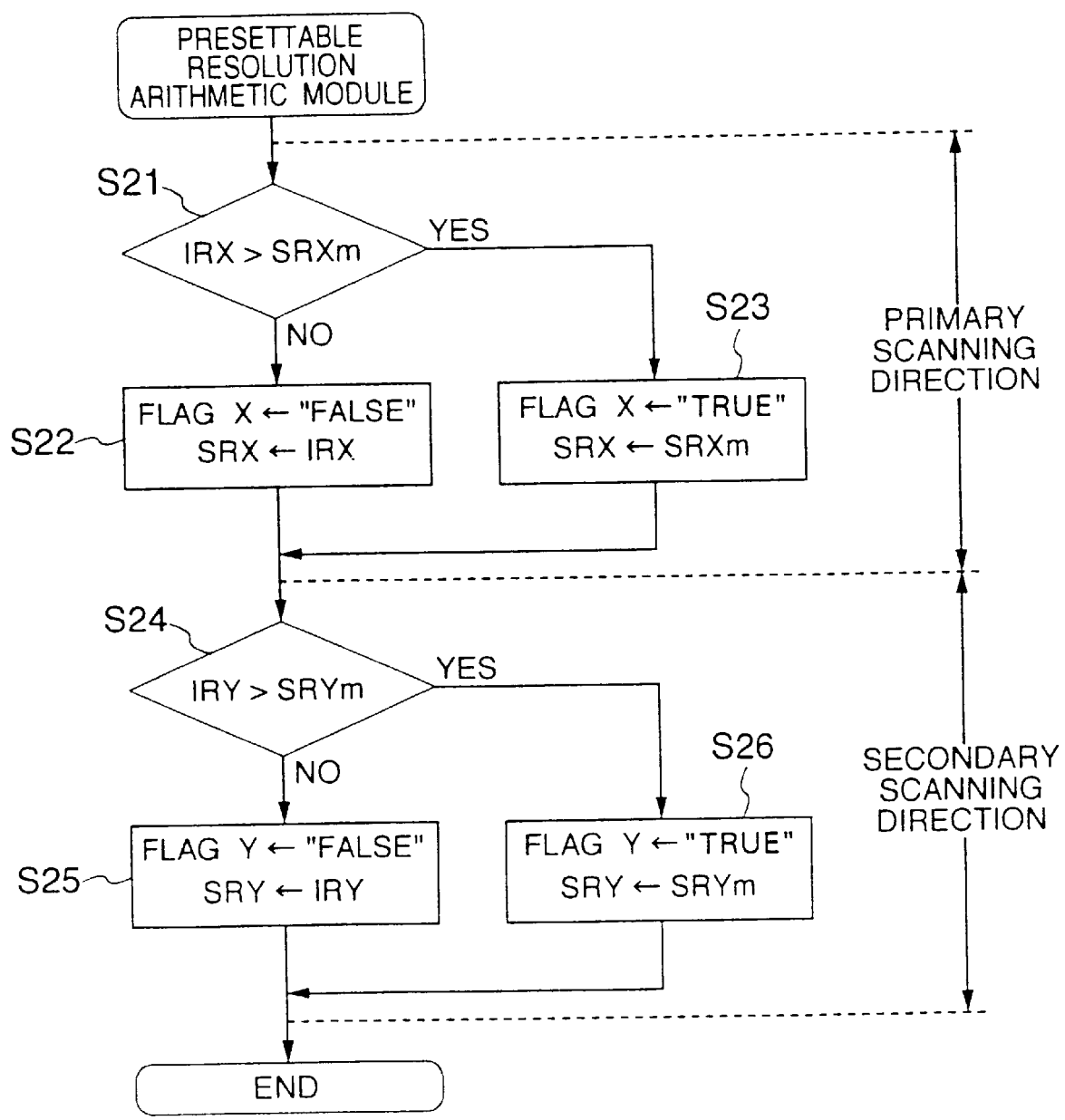
FIG. 3 is a flow chart for illustrating operation of a presettable resolution arithmetic module.

FIG. 3 is a flow chart for illustrating operation of the presettable resolution arithmetic module 3. In general, the presettable resolution arithmetic module 3 is so designed as to decide whether the reading resolution designated by the user or the maximum reading resolution which can be set at the scanning unit 1 is to be set for the reading operation in the primary scanning direction and the secondary scanning direction, respectively.

Referring to FIG. 3, in a step S21, the designated primary-scan reading resolution IRX for the reading operation in the primary scanning direction as inputted by the user is compared with the presettable maximum primary-scan resolution SRXm for the reading operation in the primary scanning direction which can be set at the scanning unit 1. When the designated primary-scan reading resolution IRX is greater than the presettable maximum primary-scan resolution SRXm, decision is made to the effect that the interpolation processing for the primary scan is to be validated, whereupon a value "true" is set for a flag X with the presettable maximum primary-scan resolution SRXm being set as the preset primary-scan resolution SRX (step S23).

On the other hand, when the designated primary-scan reading resolution IRX as inputted by the user is equal to or smaller than the presettable maximum primary-scan resolution SRXm, decision is made that no interpolation for the primary scan is performed, whereupon a value "false" is set to the flag X with the value of the designated primary-scan reading resolution IRX being set as the value of the preset primary-scan resolution SRX (step S22).

Thus, in the primary scanning direction, the image read operation is performed with the preset primary-scan resolution SRX when the designated primary-scan reading resolution IRX inputted by the user exceeds the preset primary-scan resolution SRX of the scanning unit 1, whereas the image read processing is carried out with the designated primary-scan reading resolution IRX inputted by the user unless the designated primary-scan reading resolution IRX exceeds the preset primary-scan resolution SRX.

In the secondary scanning direction, decision processings similar to those in the primary scanning direction are executed. More specifically, in a step S24, the designated secondary-scan reading resolution IRY in the primary scanning direction as designated by the user (hereinafter referred to as the designated secondary-scan reading resolution) is compared with the presettable maximum secondary-scan resolution SRYm in the secondary scanning direction which can be set for the scanning unit 1 (hereinafter referred to as the presettable maximum secondary-scan maximum resolution). When the designated secondary-scan reading resolution IRY is greater than the presettable maximum secondary-scan resolution SRYm, decision is made to the effect that the interpolation processing for the secondary scan is to be carried out, whereupon a value "true" is set for a flag Y with the presettable maximum secondary-scan resolution SRYm being set as the preset secondary-scan resolution SRY (step S26). On the other hand, when the designated secondary-scan reading resolution IRY as inputted by the user is equal to or smaller than the presettable maximum secondary-scan resolution SRYm, decision is made that no interpolation for the secondary scan is performed, whereupon a value "false" is set to the flag Y with the value of the designated secondary-scan reading resolution IRY being set as the value of the preset secondary-scan resolution SRY (step S25).

Once the reading resolution for the scanning unit 1 has been arithmetically determined in this manner, the original read operation is carried out on the basis of the set reading resolution, and the image data as read from the original is transferred to the scanner driving unit 2a.

Figure 4:
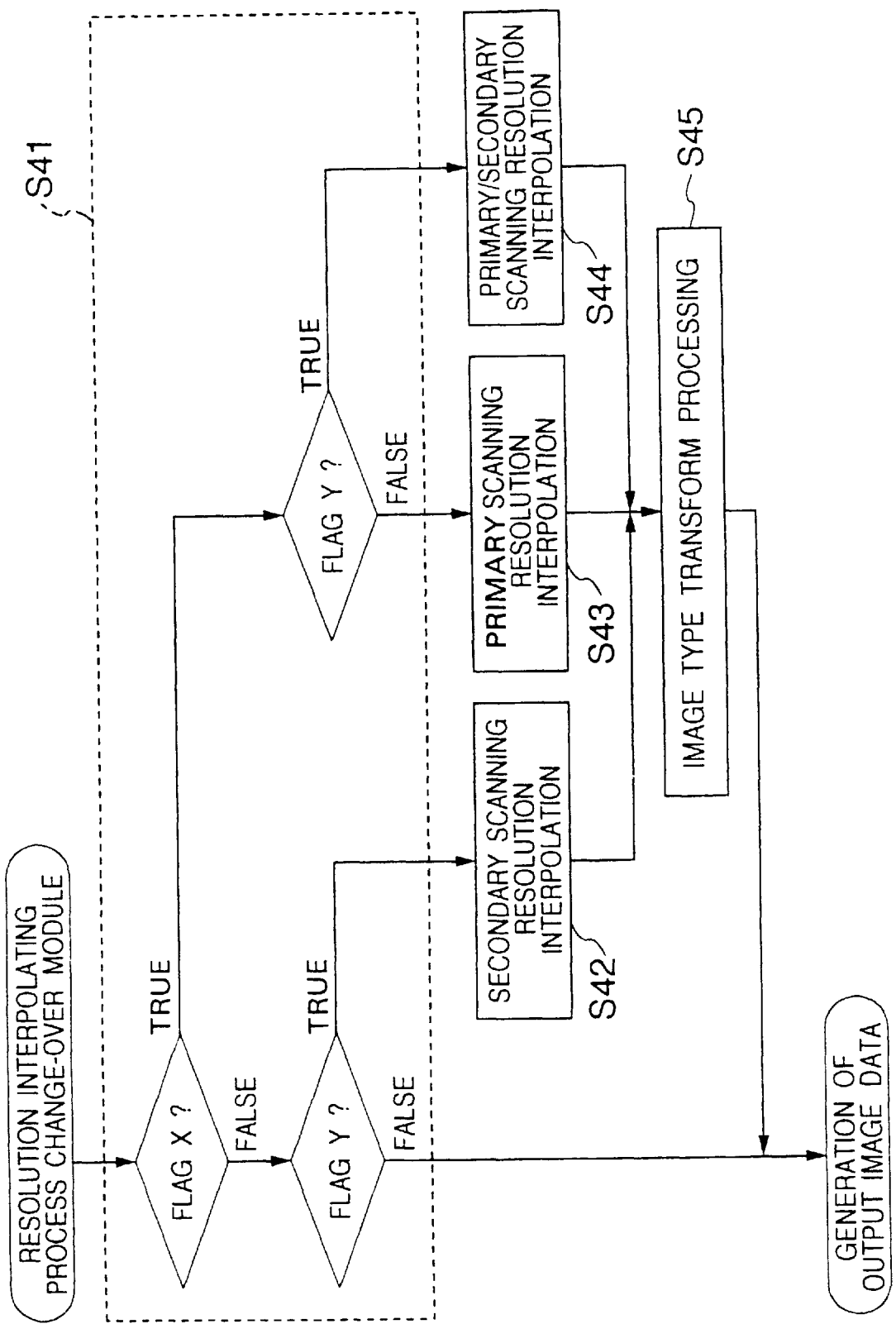
FIG. 4 is a flow chart for illustrating operations of a resolution interpolating process change-over module.

In the scanner driving unit 2a, the image data inputted from the scanning unit 1 is transferred to the resolution interpolating process change-over module 4. In this conjunction, FIG. 4 shows operations of the resolution interpolating process change-over module 4 in a flow chart. Referring to the figure, the flags X and Y set by the presettable resolution arithmetic module 3 are received, whereon decision is made on the basis of the values of these flags as to whether or not the image data received form the scanning unit 1 is to undergo the primary scan resolution interpolating process and/or secondary scan resolution interpolating process. More specifically, when both the flags X and Y are "true", it is decided that the primary scan resolution interpolating process and the secondary scan resolution interpolating process have to be carried out, whereon the procedure proceeds to a step S44. On the other hand, when the flag X is "true" with the flag Y being "false, it is decided that only the primary scan resolution interpolating processing is to be executed, whereon the procedure proceeds to a step S43. By contrast, in case the flag X is "false" with the flag Y being "true", it is decided that only the secondary scan resolution interpolating processing is to be performed, whereon the procedure proceeds to a step S43. Finally, in case both the flags X and Y are "false", decision is made that no resolution interpolating processing is to be performed at all. In this case, the image data as read from the original is outputted intact (i.e., without undergoing any interpolation).

In the primary scanning resolution interpolating process carried out by the primary scanning resolution interpolating module 7 and the primary/secondary scanning resolution interpolating module 9, a scale factor Zx for the interpolation processing is arithmetically determined on the basis of the designated primary-scan reading resolution IRX and the presettable maximum primary-scan resolution SRXm in accordance with the following expression:

$$Zx = InResoX/ScResoX \text{ max} \tag{5}$$

Subsequently, the input image data is interpolated by resorting to the DDA (digital differential analysis) algorithm as described hereinbefore in conjunction with the prior art. Thus, the output image data can be obtained. This resolution interpolating processing can be realized softwarewise. Furthermore, in the secondary scanning resolution interpolating processing carried out by the secondary scanning resolution interpolating module 8 and the primary/secondary scanning resolution interpolating module 9, a scale factor Zy for the interpolation processing is arithmetically determined on the basis of the designated secondary-scan reading resolution IRY and the presettable maximum secondary-scan resolution SRYm in accordance with the following expression:

$$Zy = InResoY/ScResoY \text{ max} \tag{6}$$

Subsequently, the input image data is interpolated by the DDA (digital differential analysis) algorithm as described hereinbefore in conjunction with the prior art. Thus, the output image data can be obtained.

Additionally, for the image data undergone the resolution interpolating processing, the image transformation processing for transforming the image data into an image type designated by the user is carried out by the image type transforming module 6a. In this way, the image desired by the user can be obtained while suppressing deterioration of the image quality ascribable to the resolution interpolating processing to a possible minimum.

Embodiment 2

Figure 5:
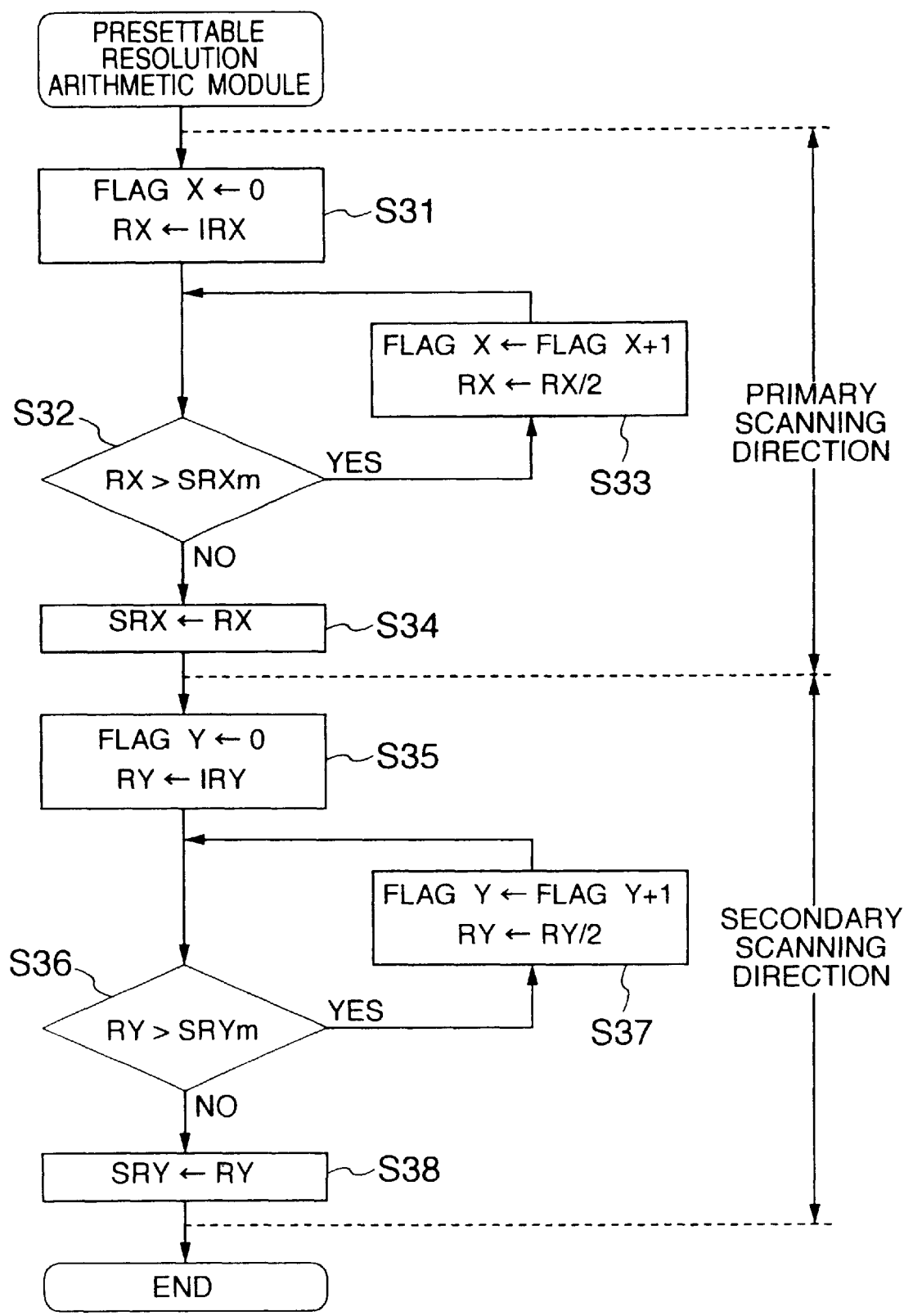
FIG. 5 is a flow chart illustrating operation of a presettable resolution arithmetic module in an image input device according to a second embodiment of the invention.

The image input device according to a second embodiment of the present invention differs from that of the first embodiment described above in respect to the operation of the presettable resolution arithmetic module. FIG. 5 is a flow chart illustrating operation of the presettable resolution arithmetic module in the image input device according to the second embodiment of the invention. In the presettable resolution arithmetic module 3 according to the instant embodiment, the flag X is set to "0" (zero) with regard to the primary scanning direction while a presumptive primary-scan resolution value RX being set to the designated primary-scan reading resolution IRX inputted by the user as the initial value thereof (step S31).

Subsequently, in a step S32, it is decided whether or not the presumptive primary-scan resolution value RX exceeds the presettable maximum primary-scan resolution SRXm of the scanning unit 1. When this decision step S32 results in affirmation "YES", the flag X is incremented by "1" and additionally the presumptive primary-scan resolution value RX is set to a half value (step S33). In a succeeding step S32, it is again decided whether or not the presumptive primary-scan resolution value RX updated as mentioned above exceeds the presettable maximum primary-scan resolution SRXm. When the answer of this decision (step S32) is affirmative or "YES", the processing step S33 is executed repetitively for updating correspondingly the presumptive primary-scan resolution value RX. When the presumptive primary-scan resolution value RX becomes smaller than the presettable maximum primary-scan resolution SRXm, the presumptive primary-scan resolution value RX at that time point is set as the preset primary-scan resolution SRX (step S34).

As is apparent from the above, by multiplying the designated primary-scan reading resolution IRX inputted by the user by $½^X$ (where X=1, 2, . . . ), there can be arithmetically determined the preset primary-scan resolution SRX which does not exceed the presettable maximum primary-scan resolution SRXm.

Similarly, in the scanning in the secondary scanning direction, the designated secondary-scan reading resolution IRY is compared with the presettable maximum secondary-scan resolution SRYm through the procedure described above, which is then followed by the processing in the step S37, whereby the presettable secondary-scan resolution SRY which does not exceed the presettable maximum secondary-scan resolution SRYm is arithmetically determined (step S38) for thereby making a decision as to the necessity or non-necessity for the resolution interpolating processing in the secondary scanning direction.

In the primary scan resolution interpolating processing performed by the primary scanning resolution interpolating module 7 and the primary/secondary scanning resolution interpolating module 9, the image data can be interpolated to the resolution desired by the user by repeating 2X times (where X represents the value of the flag X) each of the pixels of the input image data in the primary scanning direction as read by the scanning unit 1 with the preset primary-scan resolution SRX. Thus, the time taken for the interpolation processing can be shortened.

Similarly, in the secondary scan resolution interpolating processings performed by the secondary scanning resolution interpolating module 8 and the primary/secondary scanning resolution interpolating module 9, the image data can be interpolated to the resolution in the secondary scanning direction desired by the user by repeating 2Y times (where Y represents the value of the flag Y) the data line of the input image data in the secondary scanning direction with the preset secondary-scan resolution SRY.

By virtue of the processings described above, the interpolation in the secondary scanning direction can be performed within a short time without need for increasing capacity of the line buffer memory.

Incidentally, the ensuing or succeeding processing steps are similar to those described previously in conjunction with the first embodiment of the invention.

Embodiment 3

Figure 6:
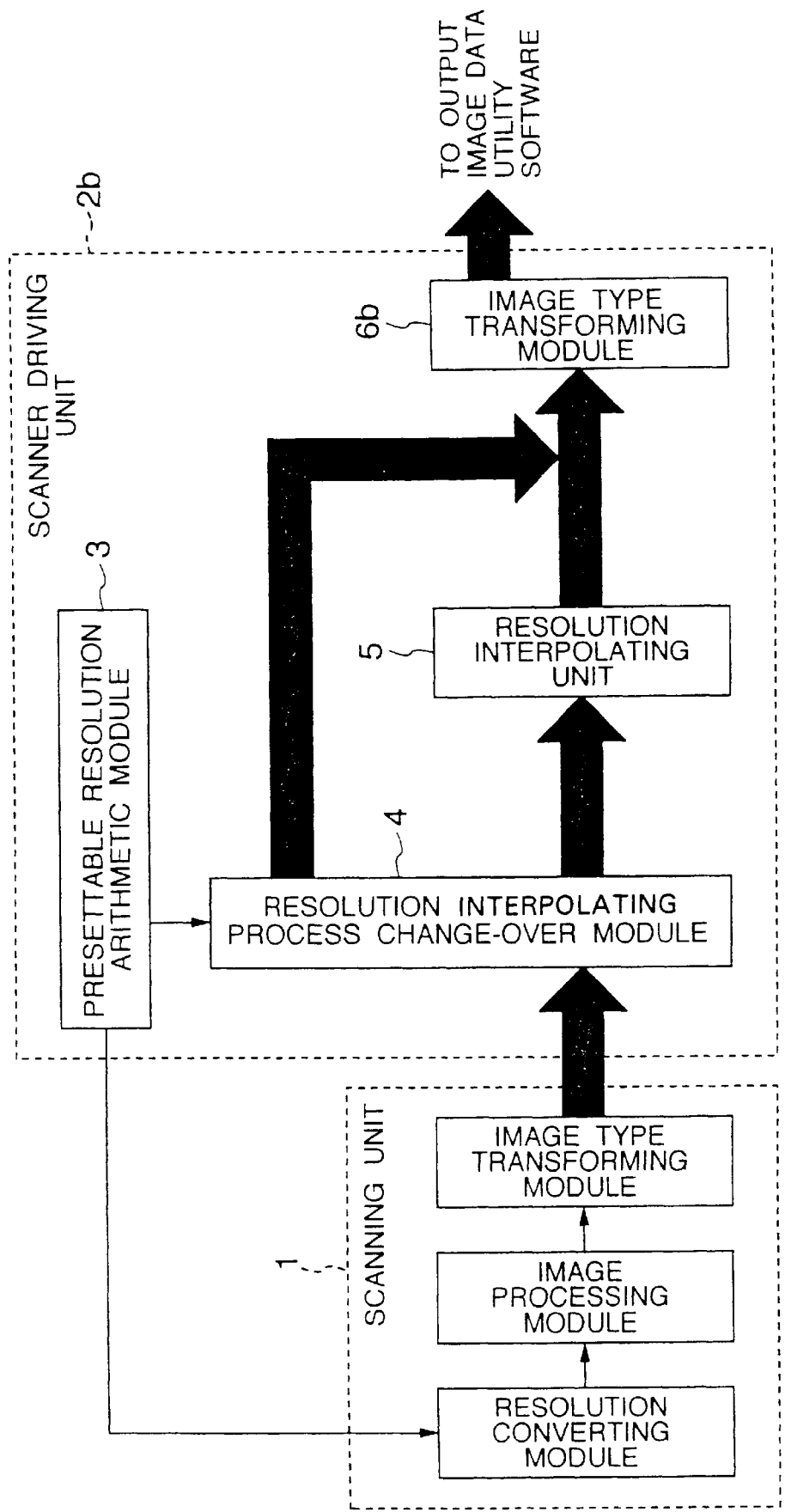
FIG. 6 is a block diagram showing schematically and generally a configuration of an image input device according to a third embodiment of the present invention.

FIG. 6 is a block diagram showing schematically and generally a configuration of the image input device according to a third embodiment of the present invention. At first, it should be mentioned that the image input device according to the third embodiment of the invention differs from the first embodiment in respect to the output path followed by the image data outputted from the resolution interpolating process change-over module 4. To say this in another way, in the image input device according to the instant embodiment of the invention, the image data inputted from the resolution interpolating process change-over module 4 is supplied to the image type transforming module 6b regardless of whether or not the resolution interpolating processing has been performed on the image data.

Figure 7:
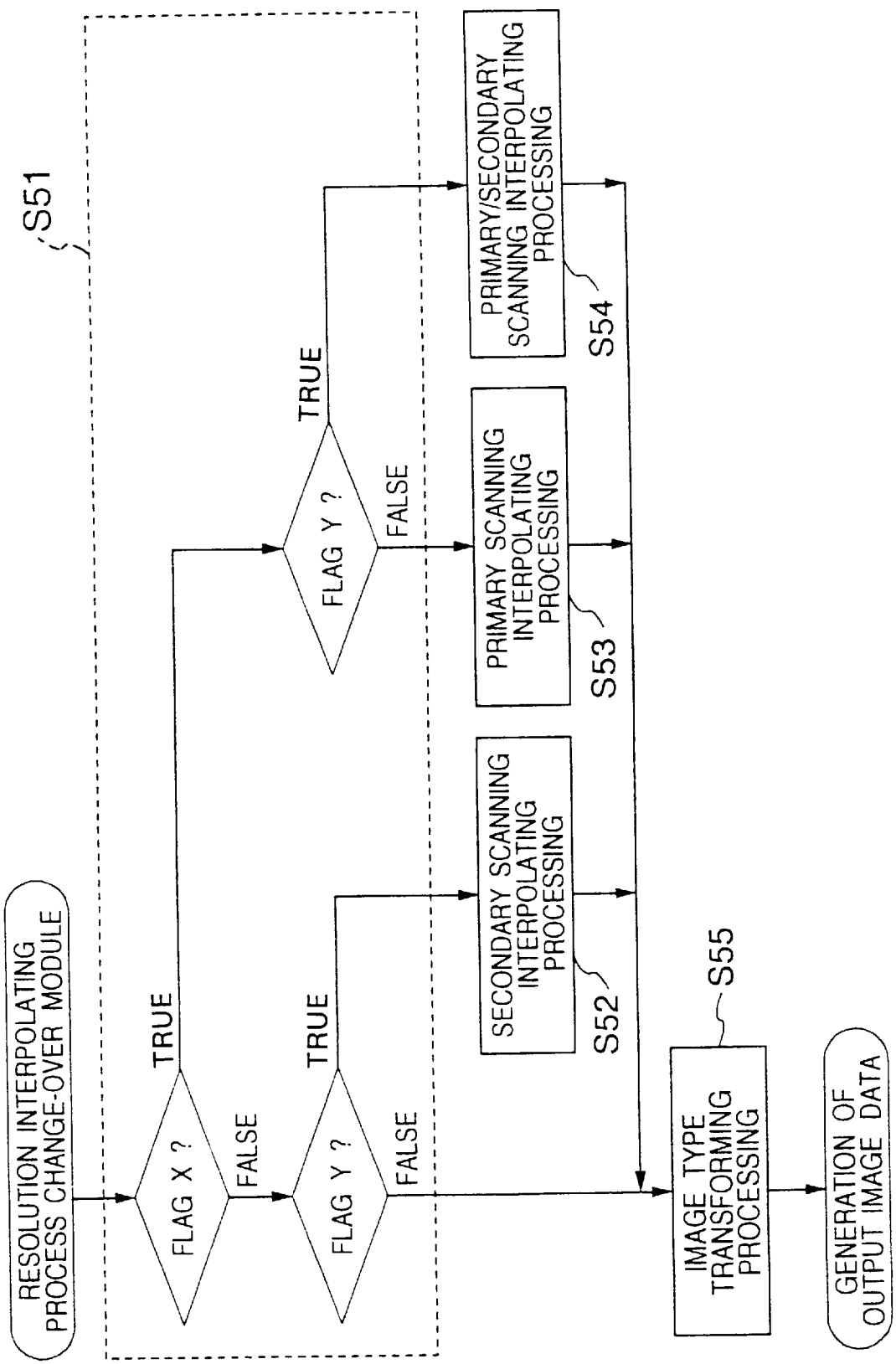
FIG. 7 is a flow chart for illustrating operation of a scanner driving unit of the image input device shown in FIG. 6.

FIG. 7 is a flow chart for illustrating operation of the scanner driver. Referring to the figure, the image data inputted from the scanning unit 1 is outputted after having undergone the image type transformation processing (step S55) regardless of whether the primary-scan resolution interpolating processing or the secondary-scan resolution interpolating processing is decided to be executed or in case the resolution interpolating processing is not to be performed at all.

In the image type transforming module 6b, the input image data read by the image type transforming module 6b may be limited to white and black image data or multi-value color image data such as, for instance, 8-bit white and black image data or 24-bit color data. Thus, the circuit or hardware overhead required for the binary processings such as the threshold value setting, dither processing, error distribution processing and the like as well as color subtraction processing can be reduced, which contributes to inexpensive implementation of the image input device, to an advantage.

Embodiment 4

Figure 8:
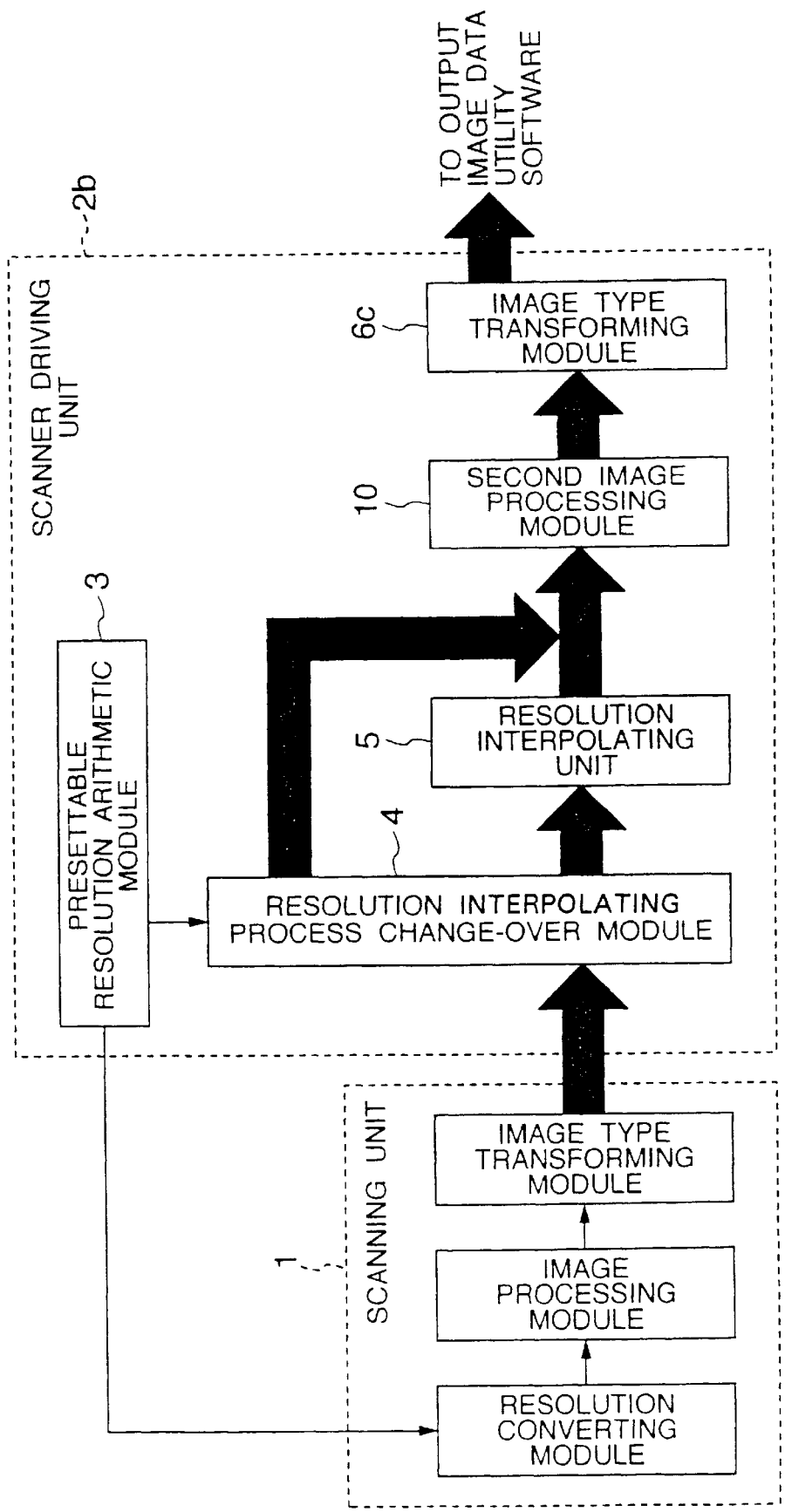
FIG. 8 is a block diagram showing schematically and generally a configuration of an image input device according to a fourth embodiment of the present invention.
Figure 9:
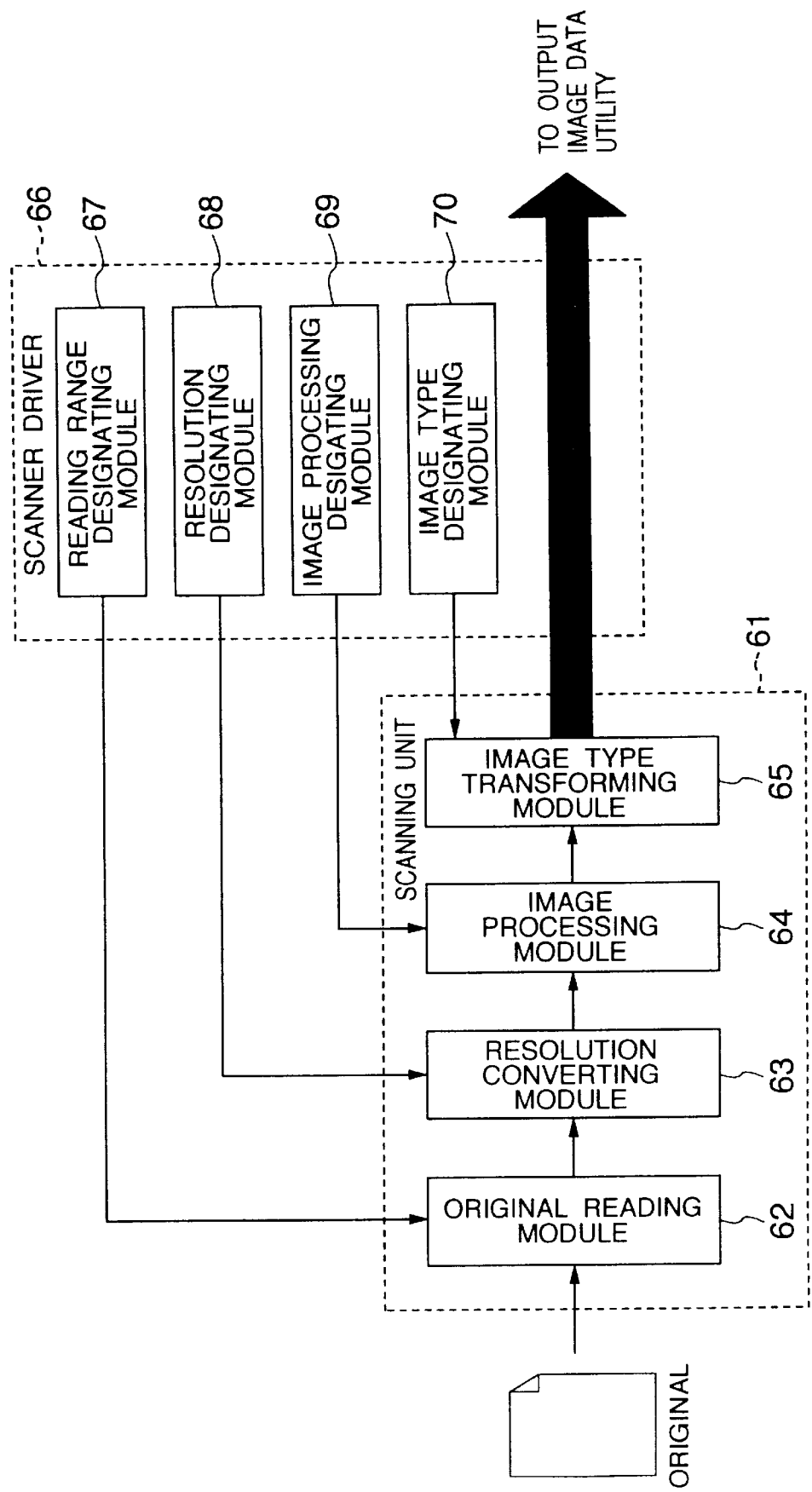
FIG. 9 is a block diagram showing generally and schematically an arrangement of a conventional image input device known heretofore.
Figure 10:
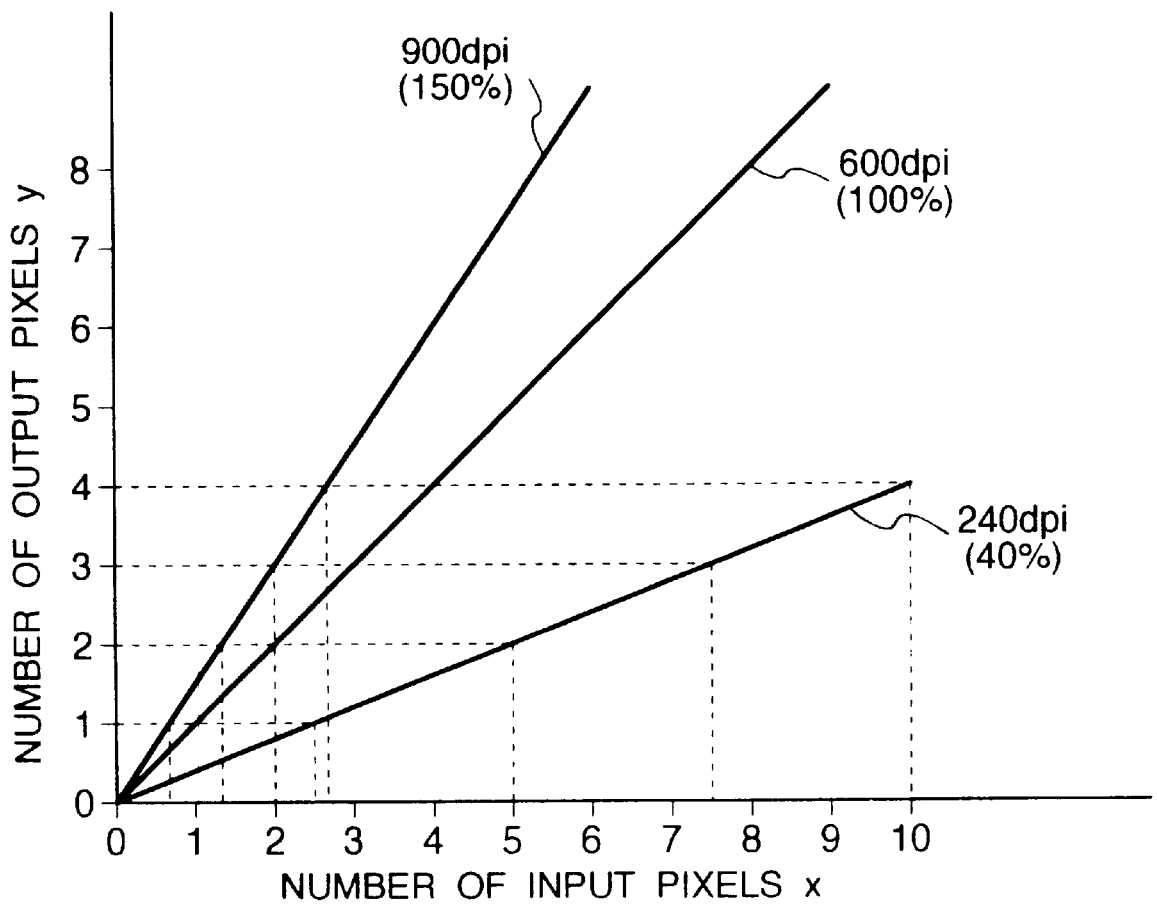
FIG. 10 is a view for illustrating a resolution converting processing in a primary scanning direction performed in the conventional image input device shown in FIG. 9.

FIG. 8 is a block diagram showing schematically and generally a configuration of the image input device according to a fourth embodiment of the present invention. Firstly, it should be mentioned that the image input device according to the fourth embodiment of the invention differs from the first embodiment in the respect that a second image processing module 10 is additionally provided. More specifically, the second image processing module 10 is provided in the stage preceding to the image type transforming module 6c and incarnates a part of the function of the image processing portion of the scanning unit 1. By virtue of this arrangement, overhead of the image processing circuit required for the image processing performed by the scanning unit 1 can be reduced, which in turn contributes to inexpensive and simple implementation of the circuit configuration to advantage.

As will now be appreciated from the forgoing description, according to the teachings of the present invention, the interpolation processing for the image data can be accomplished without being subjected to any appreciable limitation not only in the primary scanning direction but also in the secondary scanning direction by virtue of the resolution conversion processing performed by the image reader as well as the resolution interpolating processing executed by the control unit. Besides, the resolution interpolating processing can be achieved without being accompanied by any appreciable increase in the line buffer memory capacity, which can lead to simplification of the circuit configuration.

Besides, by incorporating the interpolating unit in the control unit, the amount of image data outputted from the image reader can be suppressed or reduced, whereby the time taken for the transfer of the image data can be shortened to another advantage.

Additionally, in the image input device according to the invention, the image type transformation processing such as white and black transformation processing and digitization processing can be realized internally of the control unit, whereby the processing circuit incorporated conventionally in the image reader can be spared, which is of course profitable for realization of the image reader unit at low cost.

Finally, owing to such arrangement taught by the invention that the image processing is executed by the image processing unit in precedence to the image type conversion effected by the image type conversion unit, the burden imposed on the image reader due to these image processings can be mitigated. Thus, the structure of the image reader can be simplified, whereby the image reader unit can be implemented more simply and inexpensively, to still another advantage.

Many features and advantages of the present invention are apparent from the detailed description herein and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described. Accordingly, all suitable modifications and equivalents may be resorted to, falling within the spirit and scope of the invention.

What is claimed is:

1. An image input device comprising a scanner portion and a scanner controlling portion, wherein:
    said scanner portion includes a reading sensor having controllable resolution converting means for defining a variable resolution to read an image, the variable resolution being defined not higher than a given maximum resolution, and image processing means for processing data of said image read by said sensor; and
    said scanner controlling portion includes resolution designating means for designating a sensor reading resolution to control said controllable resolution converting means, and resolution interpolating means for executing a resolution interpolating process for the output image data of said image processing means; and
    means, responsive to said maximum resolution of said sensor and a sensor reading resolution which is designated by said resolution designating means and which is not higher than said maximum resolution, for enabling said reading sensor to read with the designated resolution independently of said resolution interpolating means.

2. A device according to claim 1, wherein said resolution interpolating means executes the interpolating process in one of a main scanning direction and a sub scanning direction.

3. A device according to claim 1, wherein said resolution interpolating means executes the interpolating process in both a main scanning direction and a sub scanning direction.

4. A device according to claim 1, wherein said resolution interpolating means executes the interpolating process under control of a program.

5. A device according to claim 1, further including image type transforming means for transforming characteristics of image data interpolated by said resolution interpolating means.

6. An image input device comprising a scanner portion and a scanner controlling portion, wherein:
    said scanner portion includes a reading sensor having controllable resolution converting means for defining a variable resolution to read an image, the variable resolution being defined not higher than a given maximum resolution, and image processing means for processing data of said image read by said sensor; and
    said scanner controlling portion includes resolution designating means for designating a sensor reading resolution by employing said controllable resolution converting means, and resolution interpolating means for executing a resolution interpolating process for the output image data of said image processing means; and
    means, responsive to said maximum resolution of said sensor and a sensor reading resolution higher than said maximum resolution designated by said resolution designating means, for enabling said reading sensor to read with the designated maximum resolution and enabling said resolution interpolating means to execute the resolution interpolating process to interpolate the resolution of the output image data of said processing means to result in said designated higher resolution.

7. A device according to claim 6, wherein said resolution interpolating means executes the interpolating process in one of a main scanning direction and a sub scanning direction.

8. A device according to claim 6, wherein said resolution interpolating means executes the interpolating process in both a main scanning direction and a sub scanning direction.

9. A device according to claim 6, wherein said resolution interpolating means executes the interpolating process under control of a program.

10. A device according to claim 6, further including image type transforming means for transforming characteristics of image data interpolated by said resolution interpolating means.

11. An image input device comprising a scanner portion and a scanner controlling portion, wherein:
    said scanner portion includes a reading sensor having a controllable resolution converting means for defining a variable resolution to read an image, the variable resolution being defined not higher than a given maximum resolution, and image processing means for processing data of said image read by said sensor; and
    said scanner controlling portion includes resolution designating means for designating a sensor reading resolution, comparing means for comparing a resolution designated by said designating means and said maximum resolution of said sensor, resolution setting means responsive to said comparing means for setting a sensor reading resolution to be defined at said controllable resolution converting means, and resolution interpolating means for executing a resolution interpolating process for output image data of said image processing means.

12. A device according to claim 11, wherein said resolution interpolating means executes the interpolating process in one of a main scanning direction and a sub scanning direction.

13. A device according to claim 11, wherein said resolution interpolating means executes the interpolating process in both a main scanning direction and a sub scanning direction.

14. A device according to claim 11, wherein said resolution interpolating means executes the interpolating process under control of a program.

15. A device according to claim 11, further including image type transforming means for transforming characteristics of image data interpolated by said resolution interpolating means.

16. An image input device comprising a scanner portion and a scanner controlling portion, wherein:
    said scanner portion includes a reading sensor having a controllable resolution converting means for defining a variable resolution to read an image, the variable resolution being defined not higher than a given maximum resolution, and image processing means for processing data of said image read by said sensor; and
    said scanner controlling portion includes resolution designating means for designating a sensor reading resolution, comparing means for comparing a resolution designated by said designating means and said maximum resolution of said sensor, resolution setting means responsive to said comparing means for setting a sensor reading resolution to be defined at said controllable resolution converting means, and resolution interpolating means for executing a resolution interpolating process for output image data of said image processing means; wherein:
        said resolution setting means controls, in response to said comparing means determining that a resolution designated by said designating means is not higher than said maximum resolution of said sensor, said resolution converting means so as to convert the variable resolution to define the designated resolution to read the image by said sensor.

17. A device according to claim 16, wherein said resolution interpolating means executes the interpolating process in one of a main scanning direction and a sub scanning direction.

18. A device according to claim 16, wherein said resolution interpolating means executes the interpolating process in both a main scanning direction and a sub scanning direction.

19. A device according to claim 16, wherein said resolution interpolating means executes the interpolating process under control of a program.

20. A device according to claim 16, further including image type transforming means for transforming characteristics of image data interpolated by said resolution interpolating means.

21. An image input device comprising a scanner portion and a scanner controlling portion, wherein:

said scanner portion includes a reading sensor having a controllable resolution converting means for defining a variable resolution to read an image, the variable resolution being defined not higher than a given maximum resolution, and image processing means for processing data of said image read by said sensor; and said scanner controlling portion includes resolution designating means for designating a sensor reading resolution, comparing means for comparing a resolution designated by said designating means and said maximum resolution of said sensor, resolution setting means responsive to said comparing means for setting a sensor reading resolution to be defined at said controllable resolution converting means, and resolution interpolating means for executing a resolution interpolating process for the output image data of said image processing means; wherein:

when said comparing means determines that a resolution designated by said designating means is higher than said maximum resolution of said sensor, said resolution setting means sets said maximum resolution of said sensor to be defined at said controllable resolution converting means, said resolution converting means converts the variable resolution of said sensor to said maximum resolution to read the image by said sensor, said image processing means processes data of said image read by said sensor, and said resolution interpolating means executes the resolution interpolating process to interpolate the resolution of the output image data of said image processing means to result in said designated higher resolution.

22. A device according to claim 21, wherein said resolution interpolating means executes the interpolating process in one of a main scanning direction and a sub scanning direction.

23. A device according to claim 21, wherein said resolution interpolating means executes the interpolating process in both a main scanning direction and a sub scanning direction.

24. A device according to claim 21, wherein said resolution interpolating means executes the interpolating process under control of a program.

25. A device according to claim 21, further including image type transforming means for transforming characteristics of image data interpolated by said resolution interpolating means.

* * * * *